United States Patent
Shinchi

(10) Patent No.: US 12,557,055 B2
(45) Date of Patent: Feb. 17, 2026

(54) RADIO TERMINAL, SYSTEM, METHOD, AND NON-TRANSITORY COMPUTER READABLE MEDIUM

(71) Applicant: NEC Platforms, Ltd., Kawasaki (JP)

(72) Inventor: Takahisa Shinchi, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 1213 days.

(21) Appl. No.: 17/433,306

(22) PCT Filed: Dec. 13, 2019

(86) PCT No.: PCT/JP2019/049059
§ 371 (c)(1),
(2) Date: Aug. 24, 2021

(87) PCT Pub. No.: WO2020/174816
PCT Pub. Date: Sep. 3, 2020

(65) Prior Publication Data
US 2022/0141783 A1    May 5, 2022

(30) Foreign Application Priority Data
Feb. 26, 2019 (JP) .................................. 2019-032582

(51) Int. Cl.
*H04W 56/00* (2009.01)

(52) U.S. Cl.
CPC ....... H04W 56/005 (2013.01); H04W 56/001 (2013.01)

(58) Field of Classification Search
CPC . H04W 56/005; H04W 56/001; H04W 56/00; H04W 84/12; H04M 1/00
See application file for complete search history.

(56) References Cited

U.S. PATENT DOCUMENTS 7,715,279 B2 * 5/2010 Urano .................... G01S 19/14
368/47
7,936,794 B2 * 5/2011 Gibbons ............ H04N 21/6437
370/516

(Continued)

FOREIGN PATENT DOCUMENTS

JP    2005-341148 A    12/2005
JP    2007-104621 A     4/2007

(Continued)

OTHER PUBLICATIONS

International Search Report for PCT Application No. PCT/JP2019/049059, mailed on Jan. 14, 2020.

*Primary Examiner* — Ivan O Latorre
(74) *Attorney, Agent, or Firm* — Sughrue Mion, PLLC

(57) ABSTRACT

The present disclosure provides a radio terminal, a system, a method, and a program capable of time synchronization with other radio terminals. A radio terminal includes: a transmission unit that transmits transmission data to a plurality of other radio terminals between a first time and a second time after the first time; a reception unit that receives reception data from the plurality of other radio terminals between a third time before the first time and a fourth time after the second time; and a control unit that corrects a time of the radio terminal based on the number of the reception data received early between the third time and the first time and the number of the reception data received with a delay between the second time and the fourth time.

14 Claims, 12 Drawing Sheets

(56) References Cited

U.S. PATENT DOCUMENTS

| | | | |
|---|---|---|---|
| 2009/0017851 A1* | 1/2009 | Li | H04W 56/002 455/502 |
| 2009/0041020 A1* | 2/2009 | Gibbons | H04J 3/0664 370/394 |
| 2012/0207080 A1* | 8/2012 | Chang | H04W 56/005 370/350 |
| 2013/0272455 A1* | 10/2013 | HomChaudhuri | H04W 52/0293 375/340 |
| 2015/0023316 A1* | 1/2015 | Ko | H04L 5/0048 370/330 |
| 2016/0007309 A1* | 1/2016 | Lee | H04W 56/002 370/350 |
| 2016/0150474 A1* | 5/2016 | Ang | H04W 52/0293 370/311 |
| 2016/0192309 A1* | 6/2016 | Kim | H04W 56/0025 370/350 |
| 2016/0219393 A1* | 7/2016 | Wang | H04W 4/70 |
| 2016/0353469 A1* | 12/2016 | Kim | H04W 72/569 |
| 2017/0055233 A1* | 2/2017 | Takano | H04W 4/70 |
| 2019/0281564 A1* | 9/2019 | Yang | H04W 56/00 |
| 2019/0334985 A1* | 10/2019 | Bradley | H04N 21/242 |
| 2020/0053683 A1* | 2/2020 | Gulati | H04W 56/0045 |
| 2020/0196259 A1* | 6/2020 | Kim | H04W 56/003 |
| 2022/0053440 A1* | 2/2022 | Kim | H04W 92/18 |
| 2022/0141783 A1* | 5/2022 | Shinchi | H04W 56/001 370/350 |
| 2023/0370991 A1* | 11/2023 | Min | H04W 56/0045 |

FOREIGN PATENT DOCUMENTS

| | | |
|---|---|---|
| JP | 2008-048365 A | 2/2008 |
| JP | 2009-171053 A | 7/2009 |
| JP | 2010-533425 A | 10/2010 |

\* cited by examiner

| CONDITION | NUMBER OF DATA RECEIVED IN EARLY RECEPTION PERIOD | NUMBER OF DATA RECEIVED IN DELAYED RECEPTION PERIOD | CORRECTION OF TIME DEVIATION |
|---|---|---|---|
| 1 | ZERO | ZERO | NO CORRECTION |
| 2 | ZERO | ONE OR GREATER | DELAY TIME BY x SECONDS OF MAXIMUM DELAY |
| 3 | ONE OR GREATER | ZERO | ADVANCE TIME BY y SECONDS OF MAXIMUM ADVANCE |
| 4 | ONE OR GREATER | ONE OR GREATER | NO CORRECTION |

Fig. 7

RADIO TERMINAL, SYSTEM, METHOD, AND NON-TRANSITORY COMPUTER READABLE MEDIUM

This application is a National Stage Entry of PCT/JP2019/049059 filed on Dec. 13, 2019, which claims priority from Japanese Patent Application 2019-032582 filed on Feb. 26, 2019, the contents of all of which are incorporated herein by reference, in their entirety.

TECHNICAL FIELD

The present disclosure relates to a radio terminal, a system, a method, and a program, and in particular, to a radio terminal, a system, a method, and a program that are capable of time synchronization with other radio terminals.

BACKGROUND ART

In a case in which time synchronization between a plurality of terminals is performed, a method for performing synchronization by connecting the terminals to a time management server (world clock) on a network or performing synchronization by periodically connecting the terminals to a time management master is known. In such a method, however, when a connection to a time management server or the like cannot be made, a time deviation cannot be corrected. Further, in a case in which synchronization between a plurality of radio terminals is performed, a method in which each radio terminal receives a beacon transmitted from a control apparatus, thereby performing synchronization, is known. In this method, when the radio terminal can no longer receive the beacon due to the movement of the radio terminal itself, the radio terminal operates so as not to be out of synchronization by using its own crystal oscillator. However, since the crystal oscillator has an amount of secular change of several ppm/year and thus an error of several milliseconds/hour occurs, the radio terminal cannot achieve synchronization.

Patent Literature 1 discloses a radio communication system conforming to IEEE 802.15.4 and including a small radio node that can perform communication bi-directionally, in which a fixed node and a mobile node operate in synchronization with a beacon of a gateway.

CITATION LIST

Patent Literature

Patent Literature 1: Japanese Unexamined Patent Application Publication No. 2008-048365

SUMMARY OF INVENTION

Technical Problem

As described above, when the radio terminal can no longer receive the beacon, it is difficult for the radio terminal to achieve synchronization.

An object of the present disclosure is to provide a radio terminal, a system, a method, and a program that solve the above-described problem.

Solution to Problem

A radio terminal according to the present disclosure includes:
a transmission unit configured to transmit transmission data to a plurality of other radio terminals between a first time and a second time after the first time;
a reception unit configured to receive reception data from the plurality of other radio terminals between a third time before the first time and a fourth time after the second time; and
a control unit configured to correct a time of the radio terminal based on the number of the reception data received early between the third time and the first time and the number of the reception data received with a delay between the second time and the fourth time.

A system according to the present disclosure includes a plurality of radio terminals configured to transmit and receive data to and from each other,
each of the plurality of radio terminals including:
a transmission unit configured to transmit transmission data to a plurality of other radio terminals between a first time and a second time after the first time;
a reception unit configured to receive reception data from the plurality of other radio terminals between a third time before the first time and a fourth time after the second time; and
a control unit configured to correct a time of the radio terminal based on the number of the reception data received early between the third time and the first time and the number of the reception data received with a delay between the second time and the fourth time.

A method according to the present disclosure includes:
transmitting transmission data to a plurality of other radio terminals between a first time and a second time after the first time;
receiving reception data from the plurality of other radio terminals between a third time before the first time and a fourth time after the second time; and
correcting a time of a radio terminal based on the number of the reception data received early between the third time and the first time and the number of the reception data received with a delay between the second time and the fourth time.

A program according to the present disclosure causes a computer to:
transmit transmission data to a plurality of other radio terminals between a first time and a second time after the first time;
receive reception data from the plurality of other radio terminals between a third time before the first time and a fourth time after the second time; and
correct a time of a radio terminal based on the number of the reception data received early between the third time and the first time and the number of the reception data received with a delay between the second time and the fourth time.

Advantageous Effects of Invention

According to the present disclosure, it is possible to provide a radio terminal, a system, a method, and a program that are capable of time synchronization with other radio terminals.

BRIEF DESCRIPTION OF DRAWINGS

FIG. 7 is a diagram illustrating a condition for determining a time deviation according to the example embodiment;

DESCRIPTION OF EMBODIMENTS

Figure 1:
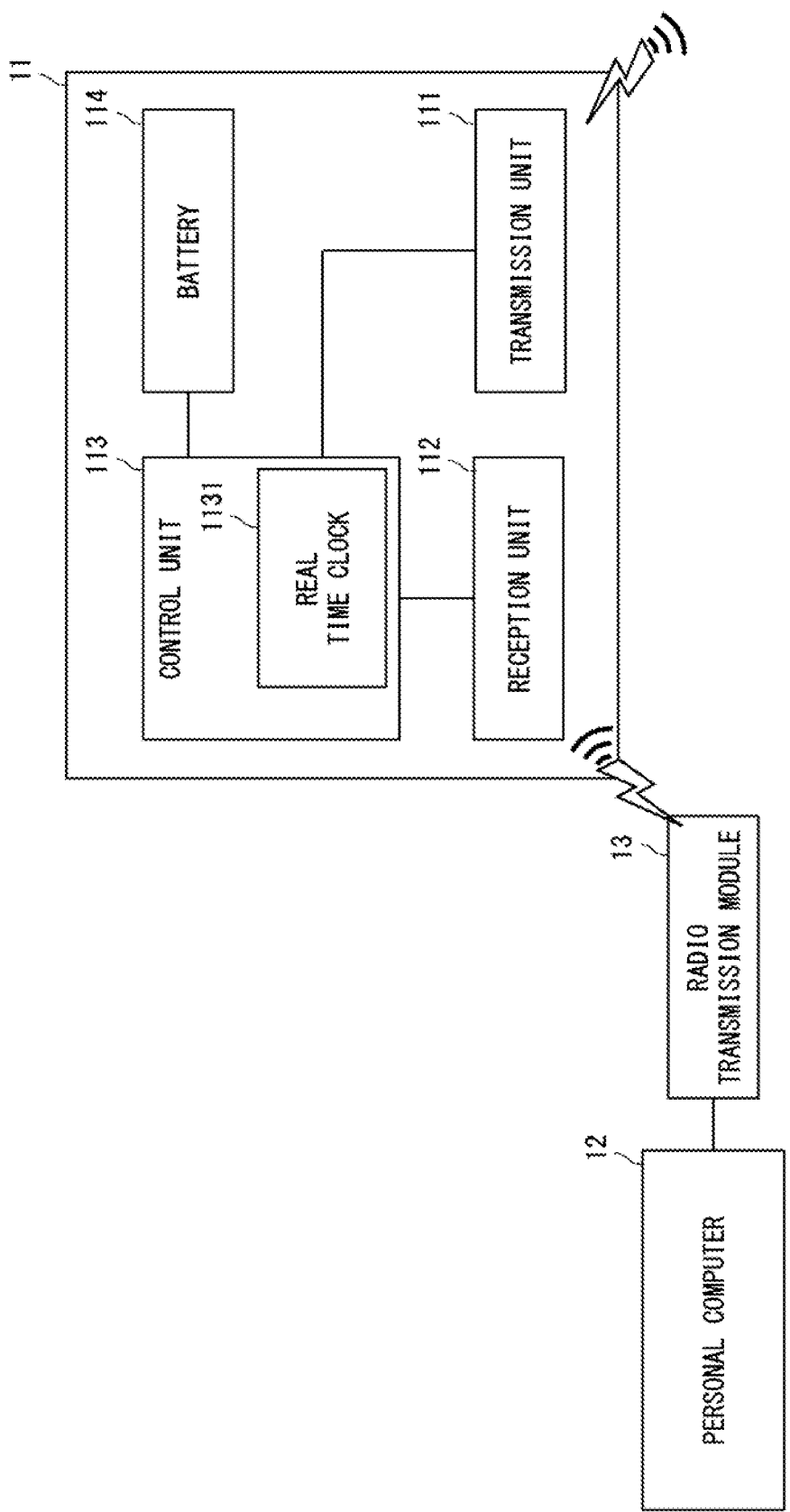
FIG. 1 is a block diagram illustrating a radio terminal according to an example embodiment.

An example embodiment according to the present disclosure will be described hereinafter with reference to the drawings. The same or corresponding elements are denoted by the same reference numerals or symbols throughout the drawings, and redundant descriptions will be omitted as necessary for the sake of clarity.

EXAMPLE EMBODIMENT

First, a configuration of a radio terminal according to the example embodiment will be described.

In the example embodiment, a description will be given of an example in which a plurality of radio terminals perform time synchronization with each other.

FIG. 1 is a block diagram illustrating the radio terminal according to the example embodiment.

Figure 2:
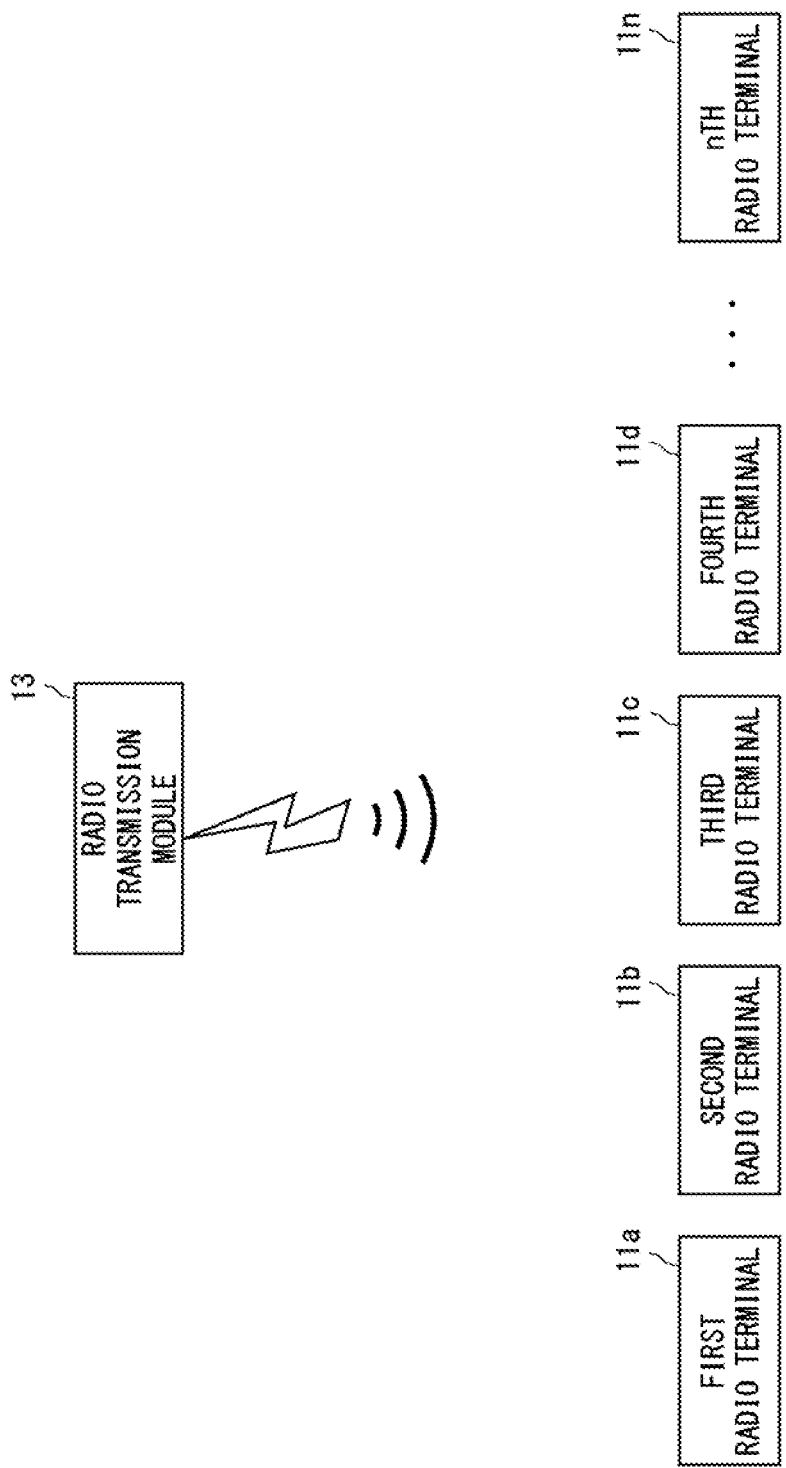
FIG. 2 is a block diagram illustrating a system according to the example embodiment.

FIG. 2 is a block diagram illustrating a system according to the example embodiment.

Figure 3:
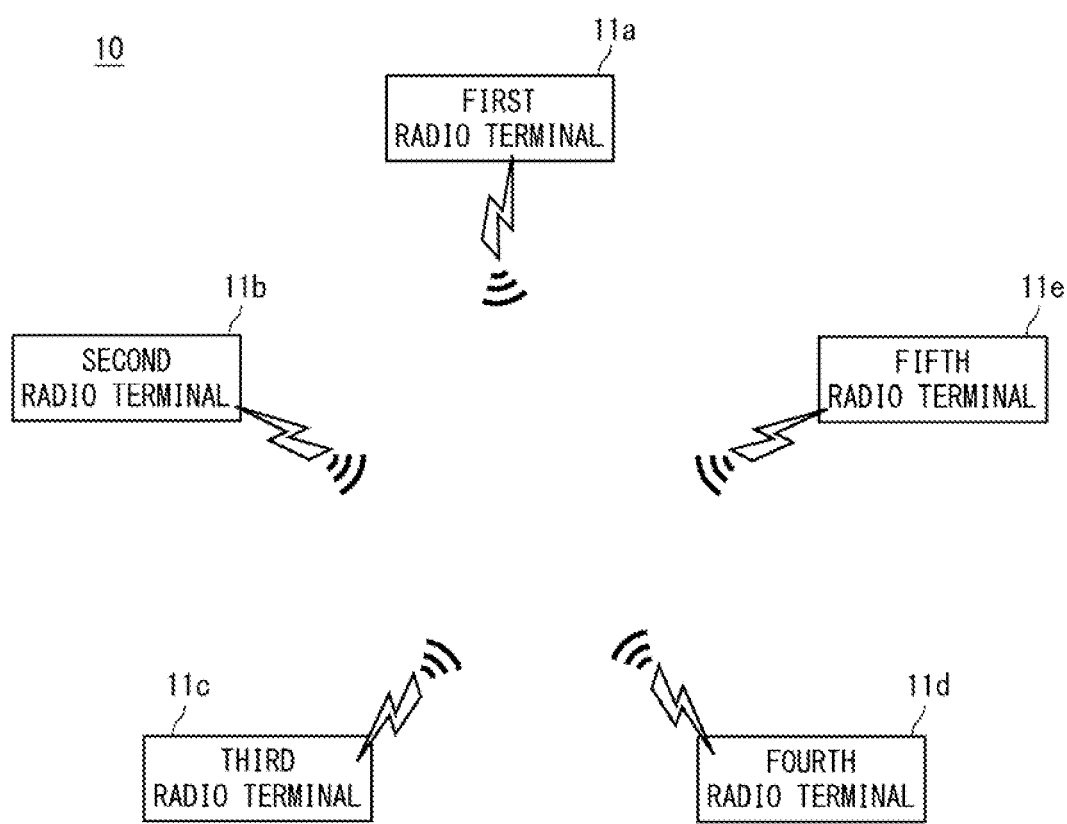
FIG. 3 is a block diagram illustrating the system according to the example embodiment.

FIG. 3 is a block diagram illustrating the system according to the example embodiment.

As shown in FIG. 1, a personal computer 12 connects to a radio transmission module 13, and sends a time synchronization command to the radio transmission module 13.

As shown in FIG. 2, the radio transmission module 13 transmits the time synchronization command from the personal computer 12 to each of a plurality of radio terminals 11. The plurality of radio terminals 11 include, for example, a radio terminal 11a, a radio terminal 11b, a radio terminal 11c, a radio terminal 11d, a radio terminal 11e, and a radio terminal 11n. The radio terminals 11a, 11b, 11c, 11d, 11e, and 11n are collectively referred to as the radio terminals 11. The radio terminal 11a may be referred to as a first radio terminal, the radio terminal 11b may be referred to as a second radio terminal, the radio terminal 11c may be referred to as a third radio terminal, the radio terminal 11d may be referred to as a fourth radio terminal, the radio terminal 11e may be referred to as a fifth radio terminal, and the radio terminal 11n may be referred to as an nth radio terminal.

Each of the plurality of radio terminals 11 includes a transmission unit 111, a reception unit 112, a control unit 113, and a battery 114. The control unit may be referred to as a radio control unit.

The control unit 113 includes a real time clock 1131. The real time clock 1131 has a time counting function. The real time clock may be referred to as an RTC (Real Time Clock). The counter of the real time clock may be referred to an RTC counter.

As shown in FIG. 3, the radio terminal 11 generates a synchronization signal for synchronization with other radio terminals 11 by using the real time clock 1131. When the total period of an active period during which the radio terminal 11 transmits and receives data and a sleep period during which the radio terminal 11 hardly transmits any data is, for example, one minute, an interrupt signal of the real time clock 1131 is set so that it is generated every one minute. By doing so, the radio terminal 11 can be controlled so that it is shifted to the active period by an interrupt every one minute from the real time clock 1131. Further, since synchronization is corrected by stopping the counter of the real time clock 1131 and writing a counter value, the time can also be corrected.

Note that other radio terminals for the radio terminal 11a are the radio terminals 11b, 11c, 11d, and 11e.

The transmission unit 111 transmits transmission data to a plurality of other radio terminals 11 between a first time t1 and a second time t2 after the first time t1. The transmission unit 111 transmits a radio communication command as the transmission data. The transmission unit may be referred to as a radio transmission module of the radio terminal.

The reception unit 112 receives a time synchronization command indicating a reference time transmitted from the radio transmission module 13.

The reception unit 112 receives reception data (a radio communication command) transmitted from the plurality of other radio terminals 11 between a third time t3 before the first time t1 and a fourth time t4 after the second time t2. The reception unit may be referred to as a radio reception module of the radio terminal.

The battery 114 supplies power for driving the radio terminal 11 and power which permits the real time clock 1131 to be continuously operated even when the power of the radio terminal 11 is off.

Note that the real time clock 1131 of each of the plurality of radio terminals 11 has an error of several ppm/year. Therefore, even when the plurality of radio terminals 11 are once synchronized with each other, a time delay or a time advance occurs between the radio terminals with the elapse of time.

The control unit 113 corrects the time of the radio terminal 11 based on the number of reception data received early between the third time t3 and the first time t1 and the number of reception data received with a delay between the second time t2 and the fourth time t4.

Note that the reception unit 112 may control the time of the radio terminal 11 after the reference time is received once. Further, the reception unit 112 may receive reception data a predetermined number of times from the plurality of other radio terminals 11 and use the reception data received the predetermined number of times for time synchronization.

In the radio terminal 11 according to the example embodiment, the control unit 113 performs the above-described control, thereby correcting the time of the radio terminal 11. By this configuration, it is possible to provide a radio terminal, a system, a method, and a program that are capable of time synchronization with other radio terminals. Further, for example, it is possible to provide the radio terminal 11 capable of performing communication in a synchronous mode of IEEE 802.15.4.

A temporal relation between transmission and reception of data by the radio terminal 11 will be described.

Figure 4A:
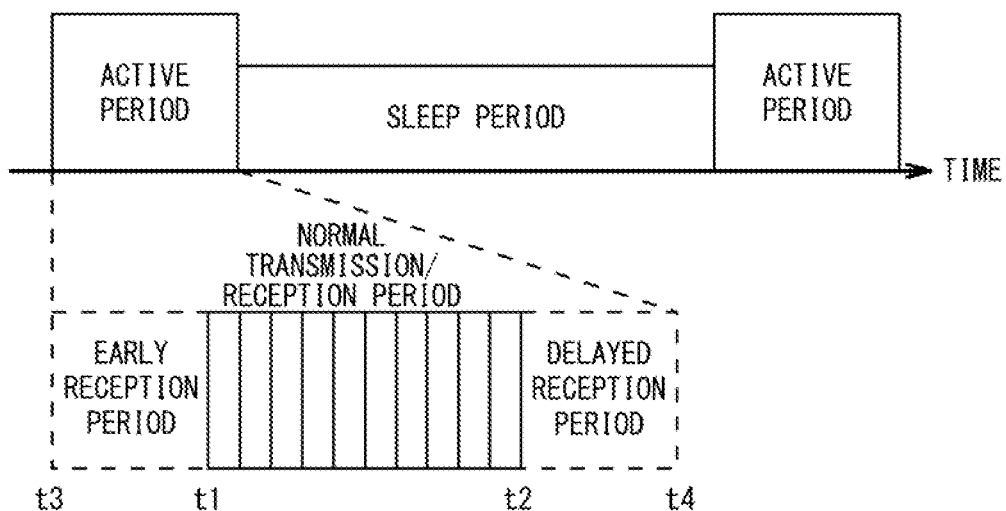
FIG. 4A is a block diagram illustrating transmission and reception of data.

FIG. 4A is a block diagram illustrating transmission and reception of data.

Figure 4B:
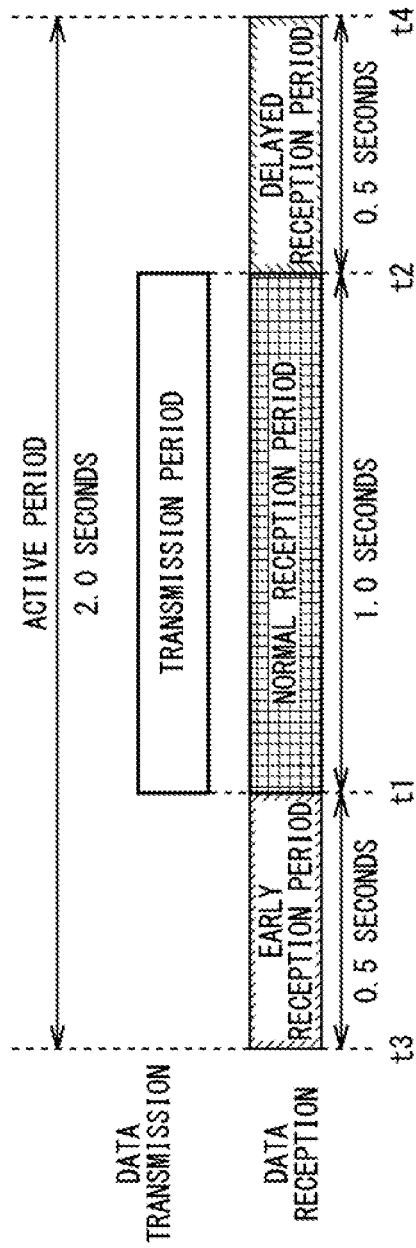
FIG. 4B is a block diagram illustrating transmission and reception of data.

FIG. 4B is a block diagram illustrating transmission and reception of data.

Figure 4C:
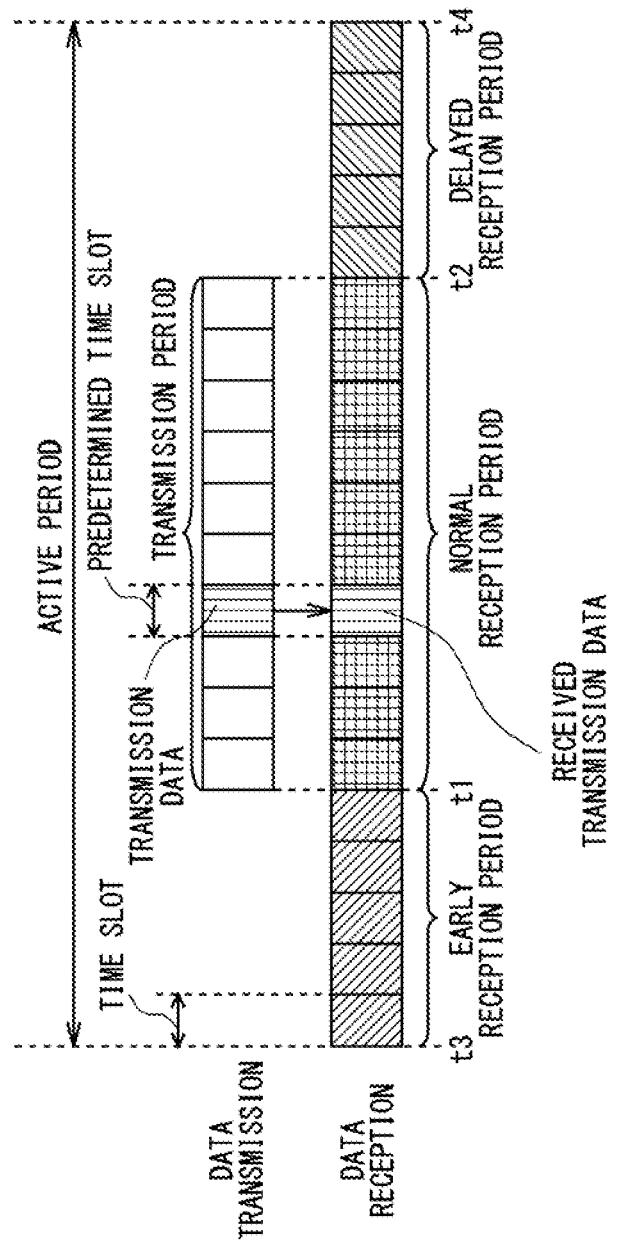
FIG. 4C is a block diagram illustrating transmission and reception of data.

FIG. 4C is a block diagram illustrating transmission and reception of data.

The respective horizontal axes of FIGS. 4A, 4B, and 4C indicate time.

As shown in FIG. 4A, in transmission and reception of data by the radio terminal 11, there are an active period during which the radio terminal 11 transmits and receives data and a sleep period during which the radio terminal 11 does not transmit and receive data. When the radio terminal 11 receives during the sleep period an active trigger for changing to the active period, the active trigger changes the radio terminal 11 from the sleep period to the active period.

The active period includes a normal transmission/reception period, an early reception period, and a delayed reception period. The normal transmission/reception period is a period during which it is determined that, when data is received during this period, the time is normal and no correction is required. The normal transmission/reception period includes a transmission period and a normal reception period. The early reception period is a period during which it is determined that, when data is received during this period, it is required that the time be corrected so that it is delayed. The delayed reception period is a period during which it is determined that, when data is received during this period, it is required that the time be corrected so that it is advanced. The early reception period, the normal reception period, and the delayed reception period may be collectively referred to as a reception period.

The early reception period precedes the normal transmission/reception period while the delayed reception period follows the normal transmission/reception period. Specifically, the early reception period is a period between the third time t3 and the first time t1, the normal transmission/reception period is a period between the first time t1 and the second time t2, and the delayed reception period is a period between the second time t2 and the fourth time t4. The early reception period may be referred to as an A reception area, the normal transmission/reception period may be referred to as a normal transmission/reception area, and the delayed reception period may be referred to as a B reception area.

Here, as shown in FIG. 4B, a description will be given in accordance with the assumption that, for example, a data transmission period is 1.0 seconds, a data reception period is 2.0 seconds, the early reception period is 0.5 seconds, the normal reception period and the transmission period are each 1.0 seconds, and the delayed reception period is 0.5 seconds.

Further, as shown in FIG. 4C, the active period includes 20 time slots each of 0.1 seconds. Further, the time slots 1 to 5 are defined as the early reception periods (the A reception areas). The time slots 6 to 15 are defined as the transmission periods. The time slots 16 to 20 are defined as the delayed reception periods (the B reception areas). The radio terminal 11 receives data during the active period and transmits data during the transmission period.

The radio terminal 11 randomly selects a predetermined time slot from among the time slots 6 to 15 which are the transmission periods. The radio terminal 11 checks the use state of a radio communication path by using Carrier Sense Multiple Access/Collision Avoidance (CSMA/CA), and transmits data only when it is determined that the predetermined time slot is not used.

In the example embodiment, the plurality of radio terminals 11 simultaneously transmit measurement data at the same time, and correct the time synchronization (the time deviation) using the transmission and reception of the measurement data.

Next, an overview of an operation of the radio terminal according to the example embodiment will be described.

In this example, a method in which the five radio terminals 11, namely, the radio terminal 11a, the radio terminal 11b, the radio terminal 11c, the radio terminal 11d, and the radio terminal 11e, mutually correct the synchronization and the time deviation will be described as an example.

Figure 5:
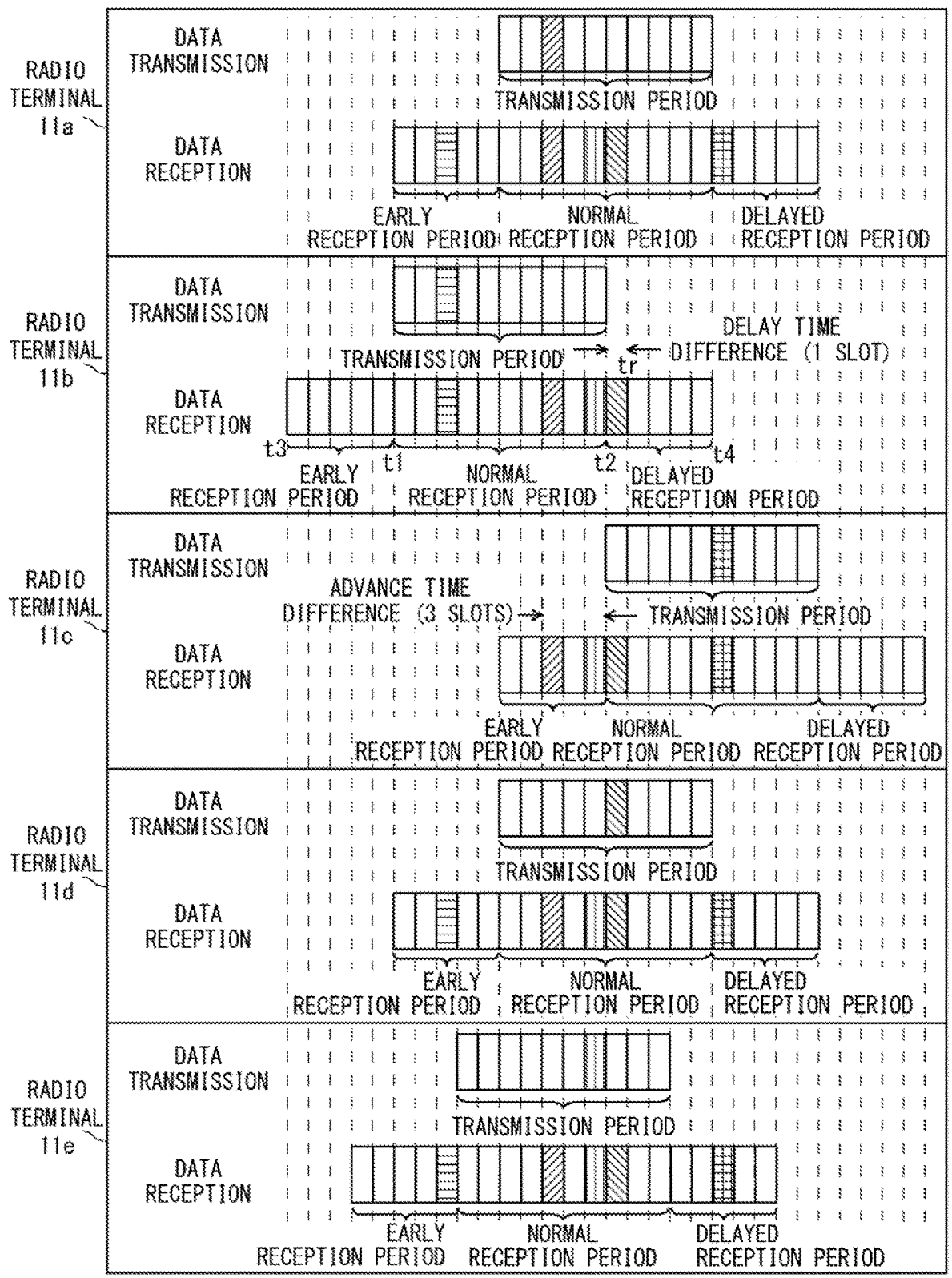
FIG. 5 is a diagram illustrating a correction of a time deviation of the radio terminal according to the example embodiment.

FIG. 5 is a diagram illustrating a correction of a time deviation of each of the radio terminals.

In FIG. 5, the horizontal axis indicates time.

First, as shown in FIG. 2, the personal computer 12 performs broadcast transmission of (broadcasts) a time synchronization command including a time to be synchronized to each of the plurality of radio terminals 11 via the radio transmission module 13. By this configuration, the plurality of radio terminals 11 perform time synchronization. After the broadcast transmission by the personal computer 12, the connection between the personal computer 12 and each of the plurality of radio terminals 11 is no longer required.

As shown in FIG. 3, the radio terminals 11a, 11b, 11c, 11d, and 11e after the time synchronization can communicate with each other.

As shown in FIG. 5, at first, a time deviation has occurred in the time of each of the radio terminals 11a, 11b, 11c, 11d, and 11e.

Transmission data transmitted during the transmission period of the radio terminal 11a is received during the reception period of the radio terminal 11a itself, and is further received during the reception period of each of the radio terminals 11, namely, the radio terminals 11b, 11c, 11d, and 11e.

Similarly, transmission data transmitted from each of the radio terminals 11b, 11c, 11d, and 11e is received in the reception period of each of the radio terminals 11. Transmission data which the radio terminals 11 cannot receive within the reception period is ignored.

Each of the radio terminals 11 determines whether the time deviation has occurred based on which period of the reception period (the early reception period, the normal reception period, and the delayed reception period) the reception data is received and how many pieces of reception data are received in this period.

The radio terminal 11b receives only zero pieces of transmission data transmitted from the radio terminals 11 in the early reception period (a time delay), only three pieces of transmission data in the normal reception period (no time deviation), and only one piece of transmission data in the delayed reception period (a time advance). In this case, the radio terminal 11b receives only one piece of transmission data in the delayed reception period in spite of the fact that transmission data is transmitted from each of the plurality of other radio terminals 11 at the same time, and therefore the radio terminal 11b determines to correct the one piece of transmission data in the delayed reception period within the normal reception period by delaying the time (the clock) of the radio terminal 11b. Thus, the radio terminal 11b determines that the time of the radio terminal 11b is being advanced. The radio terminal 11b calculates a delay time difference between a reception time tr of the reception data received in the delayed reception period and the second time t2, and learns that this difference is one slot. The radio terminal 11b delays the time of the radio terminal 11b by 0.1 seconds, which is equivalent to the aforementioned one slot.

The radio terminal 11c receives only two pieces of transmission data transmitted from the radio terminals 11 in the early reception period, receives only two pieces of transmission data in the normal reception period, and receives only zero pieces of transmission data in the delayed reception period. In this case, the radio terminal 11c determines that the time of the radio terminal 11c is delayed, and the radio terminal 11c advances the time of the radio terminal 11c by 0.3 seconds which is equivalent to three slots.

Each of the radio terminals 11a, 11d, and 11e receives only one piece of transmission data transmitted from the radio terminals 11 in the early reception period, only three pieces of transmission data in the normal reception period, and only one piece of transmission data in the delayed reception period. Each of the radio terminals 11a, 11d, and 11e has both a time delay and a time advance relative to the other radio terminals 11, and therefore determines that it is in the middle of its time deviation, and thus does not correct its time deviation.

By repeating the above correction, the radio terminals 11 can converge the time deviation and continuously perform synchronization.

Next, the operation of the radio terminal according to the example embodiment will be described in detail.

Figure 6:
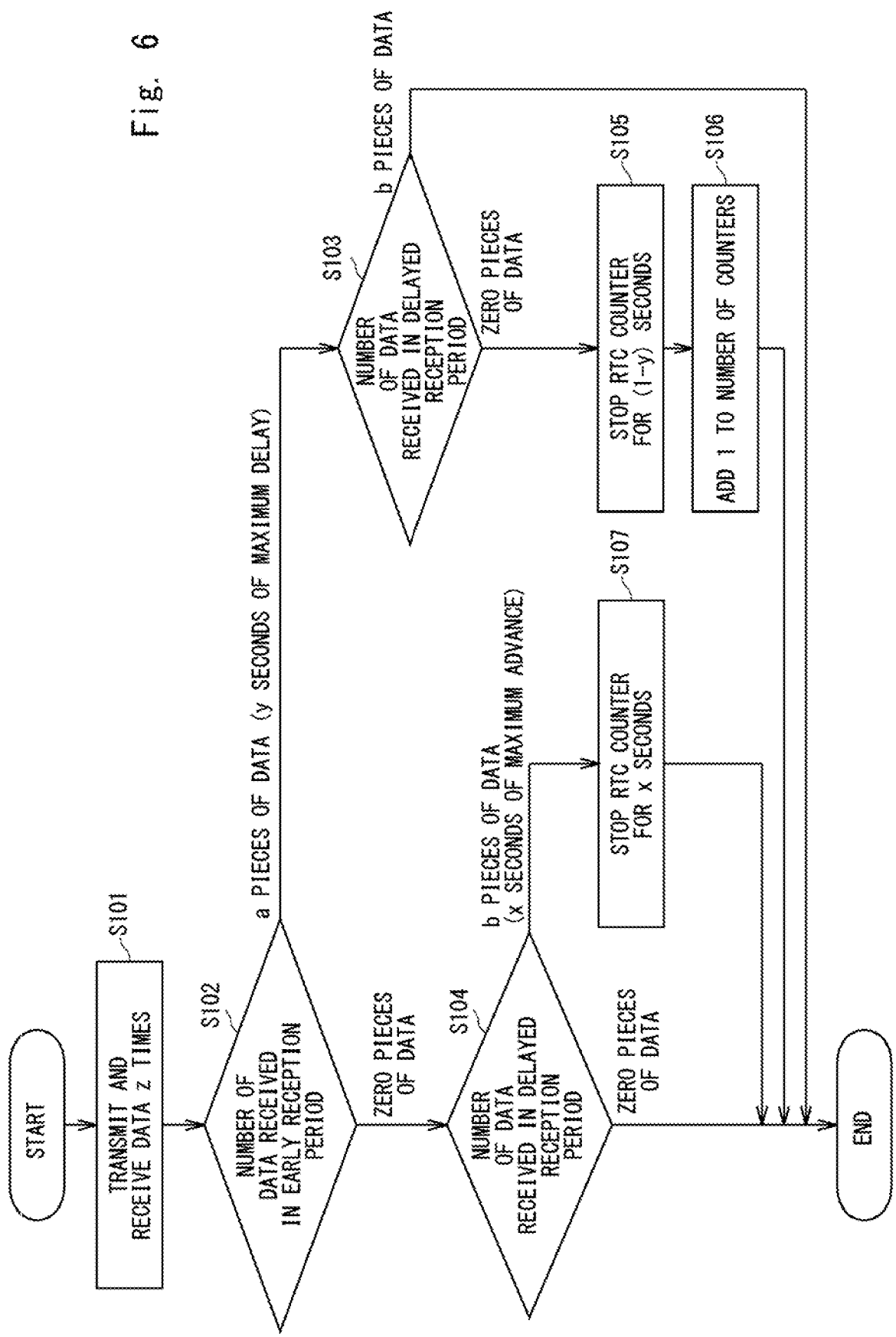
FIG. 6 is a flowchart illustrating an operation of the radio terminal according to the example embodiment.

FIG. 6 is a flowchart illustrating the operation of the radio terminal according to the example embodiment.

FIG. 7 is a diagram illustrating a condition for determining a time deviation according to the example embodiment.

As shown in FIG. 6, the radio terminals 11 transmits and receives data z times to and from other radio terminals 11 (Step S101).

As shown in FIGS. 6 and 7, the radio terminal 11 determines whether zero pieces of transmission data or a pieces of transmission data are received in the early reception period among z pieces of transmission data (Step S102). At this time, the maximum delay in the case of receiving the a pieces of transmission data between the early reception areas is defined as y seconds.

Next, based on the result of the determination in Step S102, the radio terminal 11 determines whether zero pieces of transmission data or b pieces of transmission data are received in the delayed reception period among the z pieces of transmission data (Steps S103 and S104).

When the a pieces of transmission data are received in Step S102 and the b pieces of transmission data are received in Step S103, the time deviation is not corrected.

Next, when the a pieces of transmission data are received in Step S102 and zero pieces of transmission data are received in Step S103, the radio terminal 11 determines that the time is delayed, and advances the time by y seconds of the maximum delay.

By stopping the RTC counter for (1−y) seconds, the radio terminal 11 advances the time by y seconds of the maximum delay (Step S105).

In the RTC counter, since a difference occurs between the elapsed time and the number of counters by the amount of time it has been stopped, one is added to the number of counters so that the difference between it and the elapsed time is corrected (Step S106).

Next, when zero pieces of transmission data are received in Step S102 and the b pieces of transmission data are received in Step S104, the radio terminal 11 determines that the time is being advanced. The maximum advance in b pieces of reception data is defined as x seconds. In order to correct the time advance, the RTC counter is stopped for x seconds and delayed for x seconds (Step S107).

The determination conditions from Steps S101 to S107 are summarized as follows. FIG. 7 shows one specific example of the determination condition.

(1) When the number of data received early and the number of data received with a delay are both zero, or when the number of data early received and the number of data received with a delay are both one or greater, the radio terminal 11 does not correct the time of the radio terminal 11. This corresponds to each of the conditions 1 and 4 shown in FIG. 7.

(2) When the number of data received early is one or greater and the number of data received with a delay is zero, the radio terminal 11 corrects the time of the radio terminal 11 so that it is advanced by a predetermined time. At this time, the radio terminal 11 calculates an advance time difference between the reception time of each of a plurality of pieces of reception data received in the early reception period (between the third time t3 and the first time t1) and the first time t1, and sets y seconds, which is the maximum advance time difference, in a predetermined time. This corresponds to the condition 3 shown in FIG. 7.

(3) When the number of data received early is zero and the number of data received with a delay is one or greater, the radio terminal 11 corrects the time of the radio terminal 11 so that it is delayed by the predetermined time. At this time, the radio terminal 11 calculates a delay time difference between the reception time of each of a plurality of pieces of reception data received in the delayed reception period (between the second time t2 and the fourth time t4) and the second time t2, and sets x seconds, which is the maximum delay time difference, in the predetermined time. This corresponds to the condition 2 shown in FIG. 7.

A method for deviating the time by stopping the RTC counter will be described below.

Figure 8:
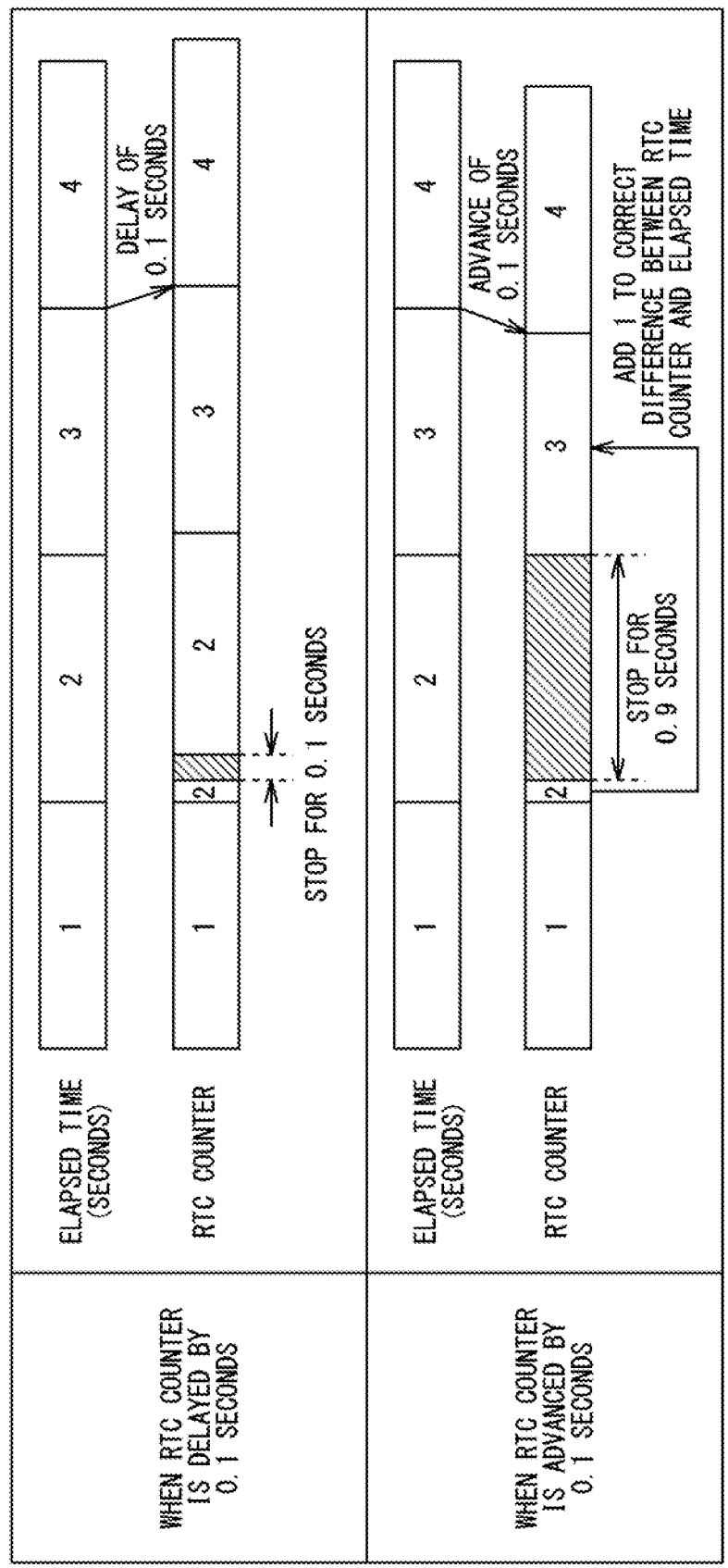
FIG. 8 is a diagram illustrating a time correction of an RTC counter.

FIG. 8 is a diagram illustrating a time correction of the RTC counter.

As shown in FIG. 8, for example, when the RTC counter is delayed by 0.1 seconds with respect to the elapsed time, the RTC counter is stopped for 0.1 seconds.

Further, in order to advance the RTC counter for 0.1 seconds, the RTC counter is stopped for 0.9 seconds, and one is added to the RTC counter value to correct the difference between it and the elapsed time (the time obtained by adding one to the RTC counter is written). In this way, it is possible to advance the RTC counter by 0.1 seconds.

Next, the operation of the radio terminal according to the example embodiment will be described in more detail.

Figure 9:
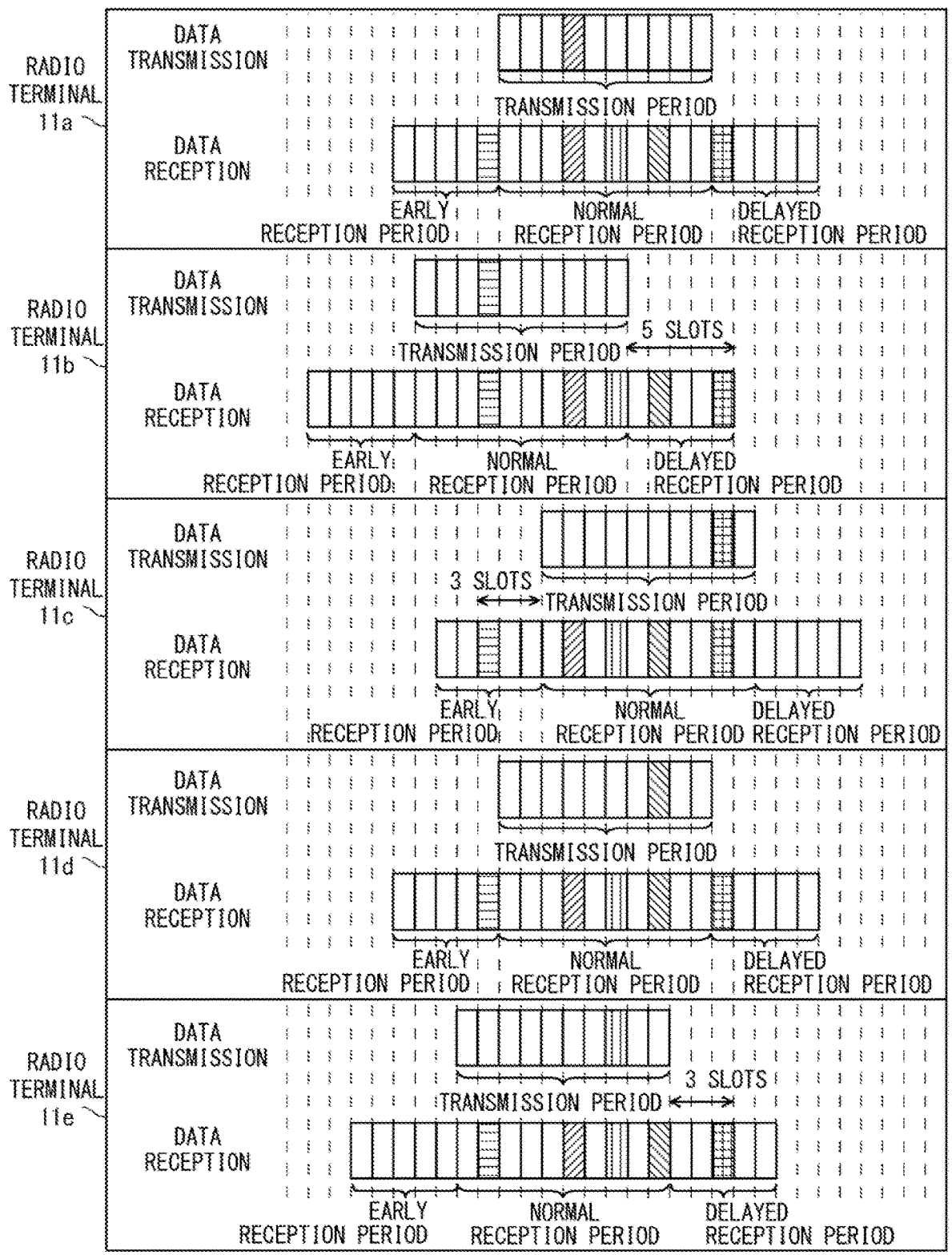
FIG. 9 is a diagram illustrating a correction of a time deviation of the radio terminal according to the example embodiment.

FIG. 9 is a diagram illustrating a correction of a time deviation of the radio terminal according to the example embodiment.

Figure 10:
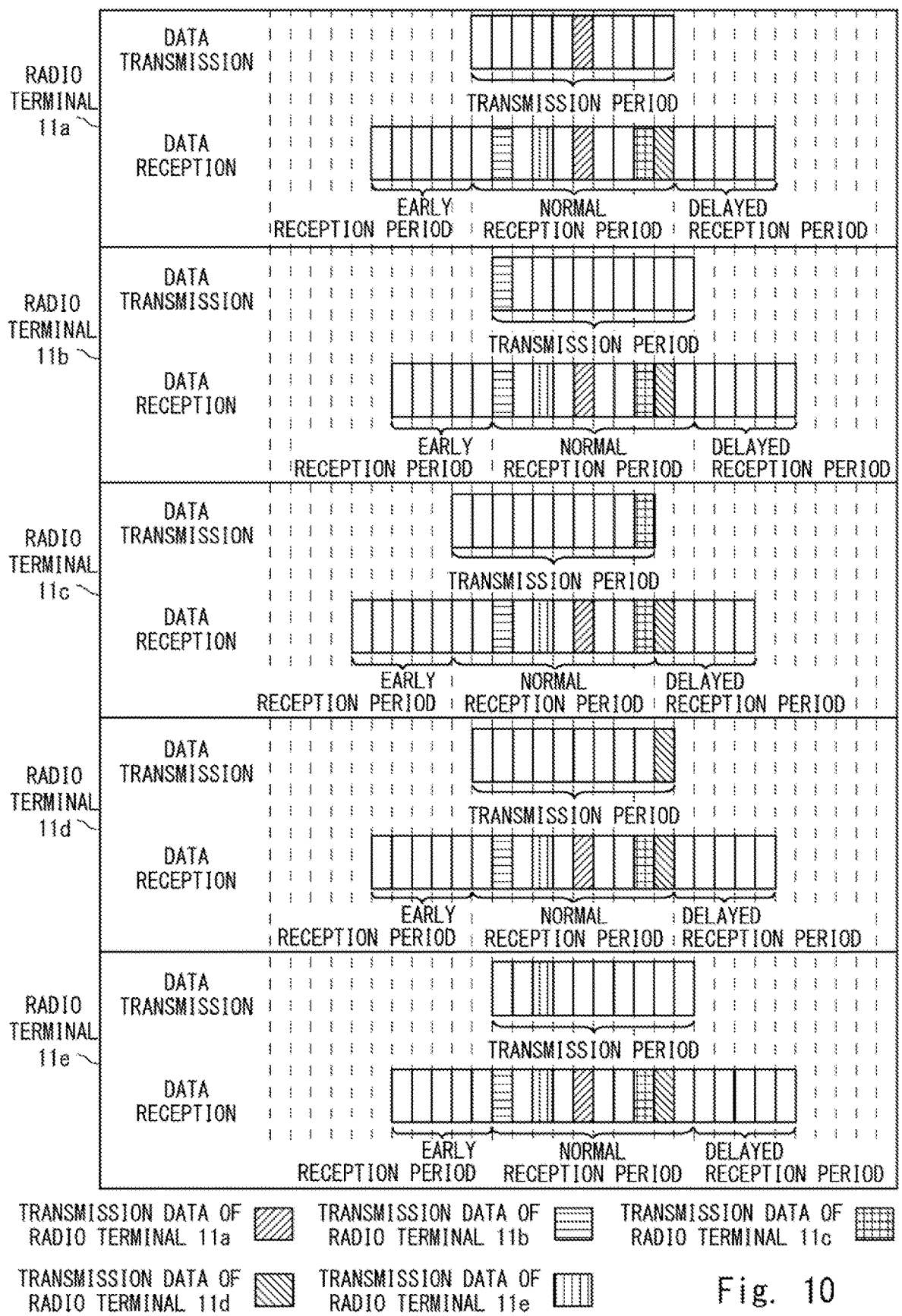
FIG. 10 is a diagram illustrating a correction of the time deviation of the radio terminal according to the example embodiment.

FIG. 10 is a diagram illustrating a correction of the time deviation of the radio terminal according to the example embodiment.

First, in a first correction of a time deviation, the radio terminal 11b has delayed the time by 0.1 seconds, the radio terminal 11c has advanced the time by 0.3 seconds, and the radio terminals 11a, 11d, and 11e have not corrected the time (see FIGS. 5 and 9). FIG. 9 shows the results of the first correction of the time deviation.

As shown in FIG. 9, since the radio terminal 11a has received one piece of data in the early reception period and has received one piece of data in the delayed reception period, the radio terminal 11a determines not to correct the time deviation.

Since the radio terminal 11b has received zero pieces of data in the early reception period and has received two pieces of data in the delayed reception period, the radio terminal 11b determines that the time is advanced by a maximum of five slots (0.5 seconds).

Since the radio terminal 11c has received one piece of data in the early reception period and has received zero pieces of data in the delayed reception period, the radio terminal 11c determines that the time is delayed by a maximum of three slots (0.3 seconds).

Since the radio terminal 11d has received one piece of data in the early reception period and has received one piece of data in the delayed reception period, the radio terminal 11d determines not to correct the time deviation.

Since the radio terminal 11e has received zero pieces of data in the early reception period and has received one piece of data in the delayed reception period, the radio terminal 11e determines that the time is advanced by a maximum of three slots (0.3 seconds).

From the above results, the radio terminals 11a and 11d do not correct the time deviation. The radio terminal 11b delays the time by 0.5 seconds. The radio terminal 11c advances the time by 0.3 seconds. The radio terminal 11e delays the time by 0.3 seconds.

FIG. 10 shows the results of a second correction of the time deviation. As a result of the second correction of the time deviation, the time deviations of the radio terminals 11 have almost been converged and the radio terminal 11 no longer have time deviations.

As described above, according to the example embodiment, when a time deviation has occurred, the plurality of radio terminals 11 mutually determine that the time deviation has occurred, and correct the time deviation, whereby it is possible to maintain the synchronization between the radio terminals 11.

For example, assume a case in which some of the radio terminals 11 are not used for three days after the synchronization of the plurality of radio terminals 11. In this case, when it is assumed that the error of the crystal oscillator is 1.5 ppm/year, a time deviation of 129.6 millisecond (ms), which is 1.5 ppm×24 hours×60 minutes×60 seconds, may occur in one day. Further, in this case, a time deviation of 388.8 ms may occur in three days.

Further, when the radio terminal 11 is made to be put into an operating state from an idle state for three days as described above, it is possible to correct the time deviation between the radio terminal 11 and other radio terminals and synchronize the radio terminal 11 with the other radio terminals by a third correction of the time deviation.

The radio terminal 11 according to the example embodiment can correct the time of the radio terminal 11 itself based on the presence or absence of reception data in the early reception period and the presence or absence of reception data in the delayed reception period. By this configuration, it is possible to synchronize the plurality of radio terminals 11 with each other.

As a result, it is possible to provide a radio terminal, a system, a method, and a program that are capable of time synchronization with other radio terminals.

Note that, in the example embodiment, the radio terminal 11 can be synchronized with other radio terminals without receiving a beacon from a control apparatus. Thus, since a system 10 does not require the control apparatus, the cost can be reduced accordingly.

Further, in the example embodiment, the radio terminal 11 can perform synchronization (a correction of a time deviation) with other radio terminals even in the absence of a time management server and a master for holding the reference time. Thus, the radio terminal 11 can reduce power consumption for connection to the time management server or the like. As a result, the radio terminal 11 can make the battery life thereof longer.

Further, in the example embodiment, synchronization between a plurality of radio terminals has been described as an example, but the present disclosure is not limited thereto. The example embodiment can also be applied to synchronization between terminals connected to each other by a wired network.

Further, in the example embodiment, although a description has been given of an example in which the radio terminals 11 perform synchronization (and a correction of a time deviation) by transmitting and receiving data to and from each other, the present disclosure is not limited thereto. In the example embodiment, data for synchronization may be transmitted and received at a predetermined timing.

Further, in the example embodiment, although the configuration of the time slot is defined as a configuration in which a data transmission time is one second (10 slots) and a data reception time is two seconds, the present disclosure is not limited thereto. In the example embodiment, the configuration of the time slot may be other than the configuration in which the data transmission time is one second and the data reception time is two seconds.

Further, in the example embodiment, although a synchronization signal for synchronization is generated by using the real time clock 1131, other configurations may instead be used.

The features of the example embodiment will be described below.

The radio transmission module 13 (a master unit radio terminal) performs broadcast transmission of (broadcasts) the reference time once to the plurality of radio terminals 11 (slave unit radio terminals), whereby the plurality of radio terminals 11 perform time synchronization.

After this time synchronization is performed, the plurality of radio terminals 11 can be synchronized with each other without involving the radio transmission module 13.

Note that although the present disclosure has been described as a hardware configuration in the above example embodiment, the present disclosure is not limited thereto. In the present disclosure, processing of each component can also be implemented by causing a Central Processing Unit (CPU) to execute a computer program.

In the above example embodiment, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described example embodiment and may be modified as appropriate without departing from the spirit of the present disclosure.

Although the present disclosure has been described with reference to the example embodiment, the present disclosure is not limited to the above-described example embodiment. Various modifications that may be understood by those skilled in the art may be made to the configurations and details of the present disclosure within the scope of the disclosure.

This application is based upon and claims the benefit of priority from Japanese patent application No. 2019-032582, filed on Feb. 26, 2019, the disclosure of which is incorporated herein in its entirety by reference.

REFERENCE SIGNS LIST

10 SYSTEM
11, 11a, 11b, 11c, 11d, 11e, 11n RADIO TERMINAL
111 TRANSMISSION UNIT
112 RECEPTION UNIT
113 CONTROL UNIT
1131 REAL TIME CLOCK
114 BATTERY
12 PERSONAL COMPUTER
13 RADIO TRANSMISSION MODULE
T1 FIRST TIME
T2 SECOND TIME
T3 THIRD TIME
T4 FOURTH TIME

What is claimed is:

1. A radio terminal comprising:
at least one memory storing, instructions; and
at least one processor configured to execute the instructions to:
   transmit transmission data to a plurality of other radio terminals between a first time and a second time after the first time;
   receive reception data from the plurality of other radio terminals between a third time before the first time and a fourth time after the second time;
   correct a time of the radio terminal based on a number of the reception data received early between the third time and the first time and the number of the reception data received with a delay between the second time and the fourth time;
   when the number of the reception data received early is one or greater and the number of the reception data received with a delay is zero, correct the time of the radio terminal so that it is advanced by a predetermined time;
   when the number of the reception data received early is zero and the number of the reception data received with a delay is one or greater, correct the time of the radio terminal so that it is delayed by the predetermined time; and
   when the number of the reception data received early and the number of the reception data received with a delay are both zero, or when the number of the reception data received early and the number of the reception data received with a delay are both one, not correct the time of the radio terminal.

2. The radio terminal according to claim 1, wherein the at least one processor further configured to calculate an advance time difference between a reception time of each of a plurality of pieces of the reception data and the first time, the plurality of pieces of the reception data being received between the third time and the first time, and to set the maximum advance time difference in the predetermined time.

3. The radio terminal according to claim 2, wherein the at least one processor further configured to control the time of the radio terminal after a reference time is received once.

4. The radio terminal according to claim 2, wherein the at least one processor further configured to receive the reception data a predetermined number of times from the plurality of other radio terminals.

5. The radio terminal according to claim 1, wherein the at least one processor further configured to calculate a delay time difference between a reception time of each of a plurality of pieces of the reception data and the second time, the plurality of pieces of the reception data being received between the second time and the fourth time, and to set the maximum delay time difference in the predetermined time.

6. The radio terminal according to claim 5, wherein the at least one processor further configured to control the time of the radio terminal after a reference time is received once.

7. The radio terminal according to claim 5, wherein the at least one processor further configured to receive the reception data a predetermined number of times from the plurality of other radio terminals.

8. The radio terminal according to claim 1, wherein the at least one processor further configured to control the time of the radio terminal after a reference time is received once.

9. The radio terminal according to claim 8, wherein the at least one processor further configured to receive the reception data a predetermined number of times from the plurality of other radio terminals.

10. The radio terminal according to claim 1, wherein the at least one processor further configured to receive the reception data a predetermined number of times from the plurality of other radio terminals.

11. The radio terminal according to claim 1, wherein the at least one processor further configured to control the time of the radio terminal after a reference time is received once.

12. The radio terminal according to claim 1, wherein the at least one processor further configured to receive the reception data a predetermined number of times from the plurality of other radio terminals.

13. A method comprising:
transmitting transmission data to a plurality of other radio terminals between a first time and a second time after the first time;
receiving reception data from the plurality of other radio terminals between a third time before the first time and a fourth time after the second time;
correcting a time of a radio terminal based on a number of the reception data received early between the third time and the first time and the number of the reception data received with a delay between the second time and the fourth time;
when the number of the reception data received early is one or greater and the number of the reception data received with a delay is zero, correcting the time of the radio terminal so that it is advanced by a predetermined time;

when the number of the reception data received early is zero and the number of the reception data received with a delay is one or greater, correcting the time of the radio terminal so that it is delayed by the predetermined time; and when the number of the reception data received early and the number of the reception data received with a delay are both zero, or when the number of the reception data received early and the number of the reception data received with a delay are both one, not correcting the time of the radio terminal.

14. A non-transitory computer readable medium storing a program for causing a computer to:

transmit transmission data to a plurality of other radio terminals between a first time and a second time after the first time;

receive reception data from the plurality of other radio terminals between a third time before the first time and a fourth time after the second time;

correct a time of a radio terminal based on a number of the reception data received early between the third time and the first time and the number of the reception data received with a delay between the second time and the fourth time;

when the number of the reception data received early is one or greater and the number of the reception data received with a delay is zero, correct the time of the radio terminal so that it is advanced by a predetermined time;

when the number of the reception data received early is zero and the number of the reception data received with a delay is one or greater, correct the time of the radio terminal so that it is delayed by the predetermined time; and when the number of the reception data received early and the number of the reception data received with a delay are both zero, or when the number of the reception data received early and the number of the reception data received with a delay are both one, not correct the time of the radio terminal.

* * * * *